US012667226B2

(12) United States Patent
Chen et al.

(10) Patent No.: US 12,667,226 B2
(45) Date of Patent: Jun. 30, 2026

(54) BEAN GRINDING COFFEE MACHINE AND BEAN GRINDING COFFEE MACHINE CONTROL METHOD

(71) Applicant: Zhuhai Hengqin Xinrun Intelligent Manufacturing Co., Ltd., Guangdong (CN)

(72) Inventors: Xiaolin Chen, Zhuhai (CN); Jianxiong Yu, Zhuhai (CN); Linxiang Zhou, Zhuhai (CN)

(73) Assignee: ZHUHAI HENGQIN XINRUN INTELLIGENT MANUFACTURING CO., LTD., Guangdong (CN)

( * ) Notice: Subject to any disclaimer, the term of this patent is extended or adjusted under 35 U.S.C. 154(b) by 440 days.

(21) Appl. No.: 18/260,457

(22) PCT Filed: Dec. 1, 2021

(86) PCT No.: PCT/CN2021/134774
§ 371 (c)(1),
(2) Date: Nov. 30, 2023

(87) PCT Pub. No.: WO2022/121747
PCT Pub. Date: Jun. 16, 2022

(65) Prior Publication Data
US 2025/0160571 A1 May 22, 2025

(30) Foreign Application Priority Data
Dec. 9, 2020 (CN) .......................... 202011428911.6

(51) Int. Cl.
*A47J 42/06* (2006.01)
*A47J 42/10* (2006.01)
*A47J 42/46* (2006.01)

(52) U.S. Cl.
CPC ............... *A47J 42/06* (2013.01); *A47J 42/10* (2013.01); *A47J 42/46* (2013.01)

(58) Field of Classification Search
CPC ............. A47J 42/06; A47J 42/10; A47J 42/46
See application file for complete search history.

(56) References Cited

U.S. PATENT DOCUMENTS

| | | | | |
|---|---|---|---|---|
| 5,201,474 A | * | 4/1993 | Midden | ................... A47J 42/20 |
| | | | | 241/246 |
| 2016/0353931 A1 | | 12/2016 | Liu | |
| 2024/0180366 A1 | * | 6/2024 | Zhou | ....................... A47J 42/08 |

FOREIGN PATENT DOCUMENTS

| | | | | |
|---|---|---|---|---|
| CN | 102309256 A | * | 1/2012 | |
| CN | 103584734 A | | 2/2014 | |

(Continued)

OTHER PUBLICATIONS

English translate (CN107581929A), retrieved date Sep. 23, 2025.*

(Continued)

*Primary Examiner* — Mohammed S. Alawadi
(74) *Attorney, Agent, or Firm* — GREENBLUM & BERNSTEIN, P.L.C.

(57) ABSTRACT

Disclosed in the present invention are a bean grinding coffee machine and a bean grinding coffee machine control method. The bean grinding coffee machine comprises a machine body, a grinding device, and a driving device. The driving device and the grinding device are located on the machine body; the grinding device is provided with a transmission shaft and a conical grinding wheel assembly; the conical grinding wheel assembly comprises an outer grinding wheel and an inner grinding wheel; the outer grinding wheel is sleeved on the inner grinding wheel; the grinding device is detachably connected to the driving device; the driving device is provided with a driving portion; the transmission shaft is transmittingly connected to the (Continued)

driving portion; and the driving device is located on one side of the transmission shaft in the circumferential direction.

7 Claims, 7 Drawing Sheets

(56)                    References Cited

FOREIGN PATENT DOCUMENTS

| CN | 107242793 | A |   | 10/2017 |
|----|-----------|---|---|---------|
| CN | 107581929 | A | * | 1/2018  |
| CN | 208388478 | U |   | 1/2019  |
| CN | 208808266 | U |   | 5/2019  |
| CN | 211093540 | U |   | 7/2020  |
| CN | 112603168 | A |   | 4/2021  |
| JP | S5258088  | U |   | 4/1977  |
| JP | S5426373  | A |   | 2/1979  |
| JP | 3205338   | U |   | 7/2016  |
| JP | 2018068757| A |   | 5/2018  |
| KR | 20100062386| A |  | 6/2010  |
| WO | 2019/142758| A1 |  | 7/2019  |

OTHER PUBLICATIONS

English translate (CN102309256A), retrieved date Sep. 23, 2025.*
Notice of Reasons for Refusal in related Japanese Application No. 2023-565643, dated May 24, 2024, 10 pages.
Written Opinion in related International Application No. PCT/CN2021/134774, mailed Feb. 23, 2022, 11 pages.
International Search Report in related International Application No. PCT/CN2021/134774, mailed Feb. 23, 2022, 4 pages.
Extended European Search Report issued in European Patent Application No. 21902454.4 dated Oct. 9, 2024.

* cited by examiner

BEAN GRINDING COFFEE MACHINE AND BEAN GRINDING COFFEE MACHINE CONTROL METHOD

CROSS-REFERENCE TO RELATED APPLICATIONS

This application is a U.S. National Phase under 35 U.S.C. § 371 of International Application No. PCT/CN2021/134774 filed Dec. 1, 202, which claims priority to Chinese Application No. 202011428911.6 filed Dec. 9, 2020. The disclosures of which are incorporated herewith by reference in their entirety.

TECHNICAL FIELD

The present disclosure relates to the field of coffee bean grinders, in particular to a bean grinding coffee machine and a method for controlling a bean grinding coffee machine.

BACKGROUND

In order to drink fresh coffee, consumers have higher requirements for the cleaning and maintenance of a bean grinder in a coffee machine, so the coffee machine that is easy to clean and easy to maintain seems particularly necessary. Currently, most bean grinding coffee machines that are detachable for cleaning on the market mainly use flat grinding wheels or blades to grind coffee beans. This kind of bean grinding device has the problem of difficulty in controlling the amount of grinding power and uneven fineness of grinding power, which affects the taste of consumers. The bean grinding device having a conical grinding wheel grinding system can effectively solve the problem of difficulty in controlling the amount of grinding powder and uneven fineness of grinding power. However, the bean grinding device having the conical grinding wheel grinding system has many grinding components and large volume. The experience is poor, and most of them cannot be disassembled for cleaning, which affects consumers' experience on the product.

SUMMARY

The object of the present disclosure is to provide a bean grinding coffee machine and a method for controlling a bean grinding coffee machine, which have the advantage of simple structure and small volume, and the grinding device can be removed as a whole for easy cleaning.

The technical solution is as follows:

The bean grinding coffee machine includes a body, a grinding device, and a driving device. The driving device and the grinding device are located on the body. The grinding device is provided with a transmission shaft and a conical grinding wheel assembly. The conical grinding wheel assembly includes an outer grinding wheel and an inner grinding wheel, and the outer grinding wheel is sleeved on the inner grinding wheel. The grinding device is detachably connected to the driving device. The driving device is provided with a driving portion. The transmission shaft is in transmission connection with the driving portion, and the driving device is located on a circumferential side of the transmission shaft.

Further, the driving portion includes a driving shaft, a first gear, and a second gear, the first gear is fixed on the driving shaft, the second gear is mounted on the grinding device, and an inner side of the second gear is engaged with an outer edge of the first gear.

Further, the inner side of the second gear is provided with a plurality of annularly arranged inner convex teeth, a circumferential outer edge of the first gear is provided with a plurality of annularly arranged outer convex teeth, the second gear is engaged with the first gear, and the inner convex teeth are alternatively engaged with the outer convex teeth.

Further, the grinding device further includes a bevel gear, one end of the transmission shaft is fixed to the inner grinding wheel, the other end of the transmission shaft is fixed to the bevel gear, the inner grinding wheel is coaxially fixed to the transmission shaft, an outer edge of the second gear is provided with bevel teeth, the bevel gear is engaged with the second gear through the bevel teeth, and the driving shaft is in transmission connection with the transmission shaft through the first gear, the second gear, and the bevel gear.

Further, the grinding device further includes a knob, an adjustment gear, and an adjustment ring, the knob is coaxially fixed to the adjustment gear, the adjustment gear and the adjustment ring are both provided with bevel teeth, the adjustment ring is located on an outer side of the outer grinding wheel, and the adjustment ring is engaged with the adjustment gear.

Further, the outer side of the outer grinding wheel is provided with a fixing buckle, an inner side of the adjustment ring is provided with a thread, and the thread and the fixing buckle are engaged with each other.

The bean grinding coffee machine further includes a raw material box providing with a screwing portion and a discharging port, the raw material box is arranged on the body through the screwing portion, and the discharging port is aligned with the grinding device.

Further, the driving device includes a driving motor, a reduction gear assembly, and a reduction box housing, the driving motor is in transmission connection with the reduction gear assembly, the driving shaft is located at an output end of the reduction gear assembly, and the reduction box housing covers the reduction gear assembly.

Further, two sides of the body are provided with movable buckles, and the grinding device is connected to the body through the movable buckles.

The method for controlling a bean grinding coffee machine includes: activating a driving device provided on a body and located on a circumferential side of a transmission shaft, and transferring, by the driving device, power to a grinding device through a driving portion and the transmission shaft; obtaining the power by the transmission shaft, driving an inner grinding wheel to rotate, fixing an outer grinding wheel, and performing relative rotation between the inner grinding wheel and outer grinding wheel; feeding raw material into in a gap between the inner grinding wheel and outer grinding wheel, and grinding, by the grinding device, the raw material into ground substance; and turning off the driving device to stop working of the grinding device.

The technical solution provided by the present disclosure has following advantage and effect.

The grinding device and the driving device are mounted on body. The driving device drives grinding device to move, coffee beans are put into the grinding device, and grinding device rotates to grind the coffee beans into powder for brewing. The driving device is located on the circumferential side of the transmission shaft, and the driving shaft provides power for the transmission shaft in a lateral direction of the transmission shaft. This mounting method avoids a requirement for a longer space volume to achieve a transmission due to the coaxial mounting of the driving shaft and the transmission shaft. When cleaning is required, the grinding device is removed from the body. The mounting of the device can reduce an axial volume of the machine, so that the whole machine is smaller and lighter, and is easier to be used.

BRIEF DESCRIPTION OF THE DRAWINGS

The accompanying drawings herein show specific examples of the technical solution of the present disclosure, and form part of the specification with the specific embodiments, which is used to explain the technical solution, principle and effect of the present disclosure.

Unless otherwise specified or otherwise defined, the same reference numerals in different drawings represent the same or similar technical features, and different reference numerals may be used to represent the same or similar technical features.

DESCRIPTION OF REFERENCE NUMERALS

10, body; 101, movable buckle; 20, grinding device; 201, outer grinding wheel; 202, inner grinding wheel; 203, transmission shaft; 204, bevel gear; 206, knob; 207, adjustment gear; 208, adjustment ring; 30, driving device; 301, driving motor; 302, reduction gear assembly; 303, reduction box housing; 304, driving shaft; 401, first gear; 4011, outer convex teeth; 402, second gear; 4021, inner convex teeth; 50, raw material box.

DETAILED DESCRIPTION OF THE EMBODIMENTS

In order to facilitate understanding of the present disclosure, specific embodiments of the present disclosure will be described more fully below with reference to the accompanying drawings.

Unless otherwise specified or defined, all technical and scientific terms used herein have the same meaning as commonly understood by one of ordinary skill in the art. In the case of combining the actual scene of the technical solution of the present disclosure, all technical and scientific terms used herein may also have meanings corresponding to the purpose of achieving the technical solution of the present disclosure.

Unless otherwise specified or otherwise defined, the terms "first, second . . . " as used herein are used only to distinguish to distinguish the names, and does not represent a specific quantity or order.

It should be noted that when an element is called "fixed to" another element, it can be directly fixed to another element or there may be intermediate elements. When an element is considered to be "connected to" another element, it can be directly connected to another element or intervening elements may also be present. When an element is considered to be "mounted to" another element, it can be directly mounted to another element or intervening elements may also be present. When an element is considered to be "disposed on" another element, it can be directly disposed on another element or intervening elements may also be present.

Unless specifically stated or otherwise defined, the "said" and "the" used herein relate to the aforementioned technical feature or the technical content, the technical feature or technical content may be the same as or similar to the aforementioned technical feature or technical content.

It should be understood that technical contents or technical features that go against the purpose of the present disclosure, or are obviously contradictory, should be excluded.

Figure 1:
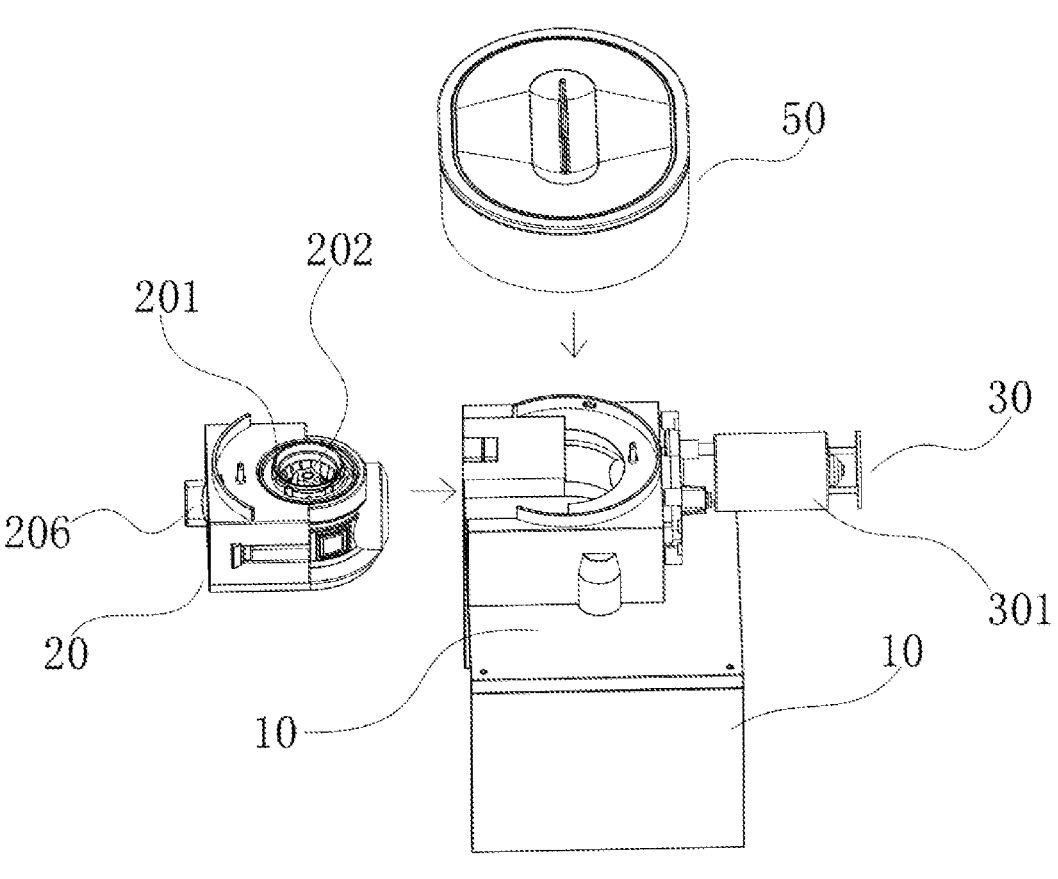
FIG. 1 is an exploded view of a bean grinding coffee machine of the present disclosure.
Figure 2:
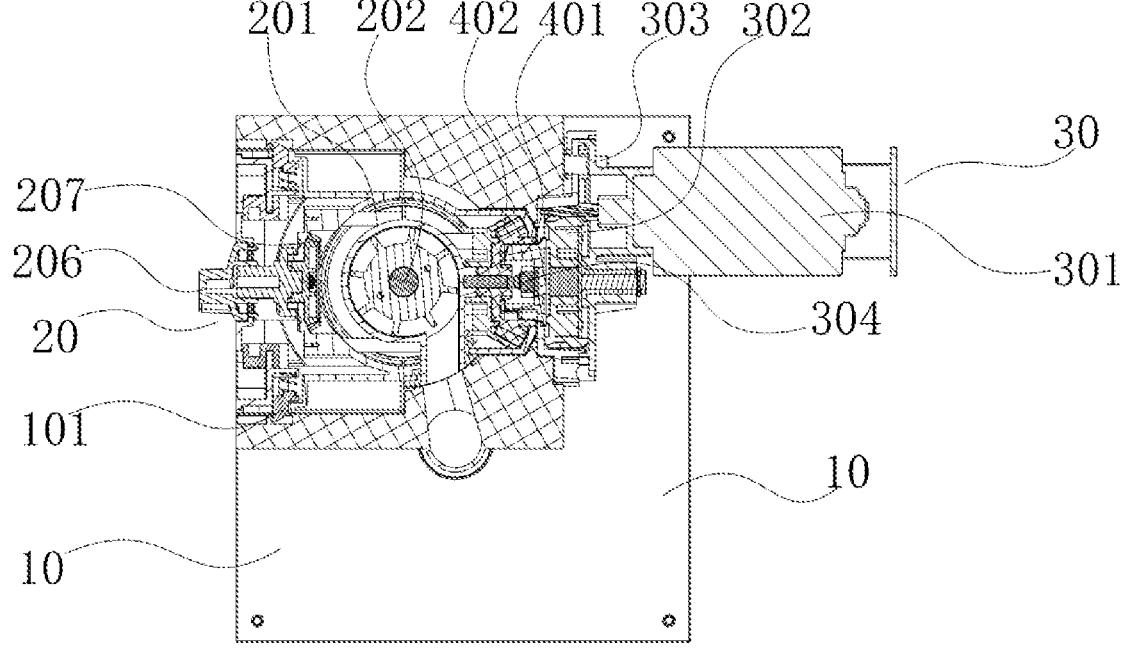
FIG. 2 is a top sectional view of the present disclosure.
Figure 3:
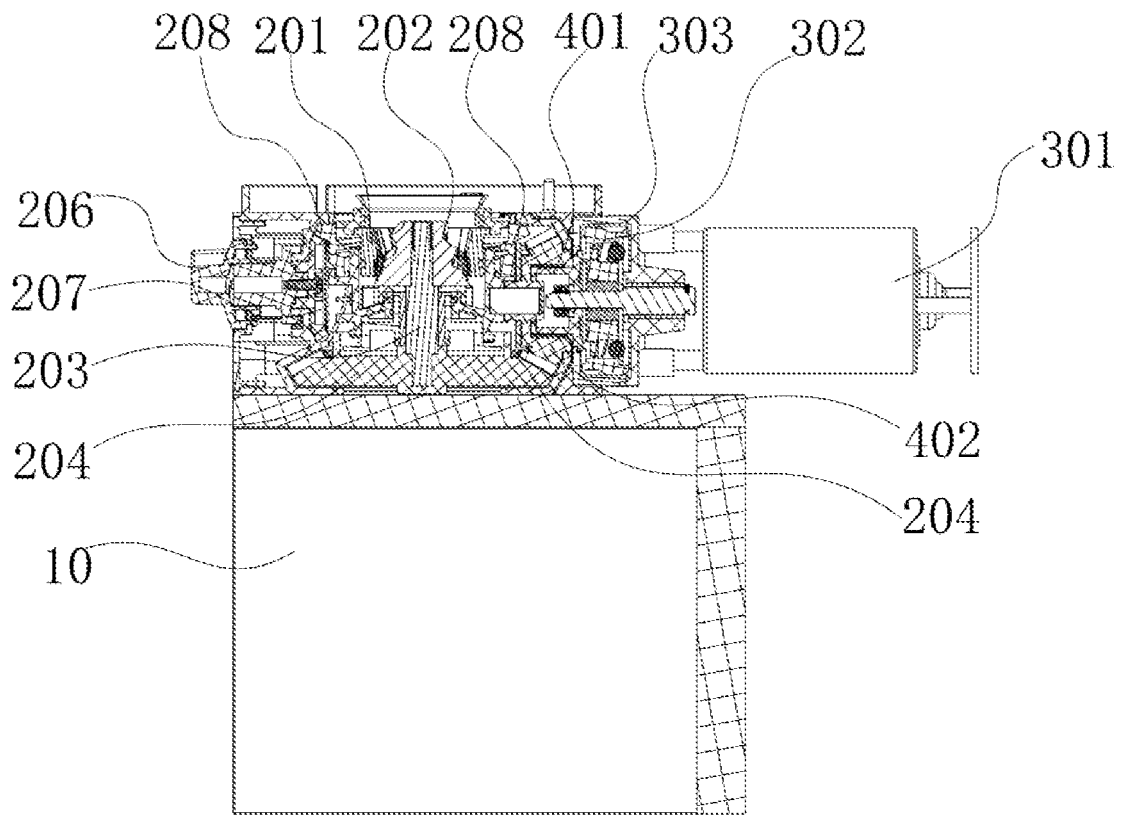
FIG. 3 is a front sectional view of the present disclosure.
Figure 4:
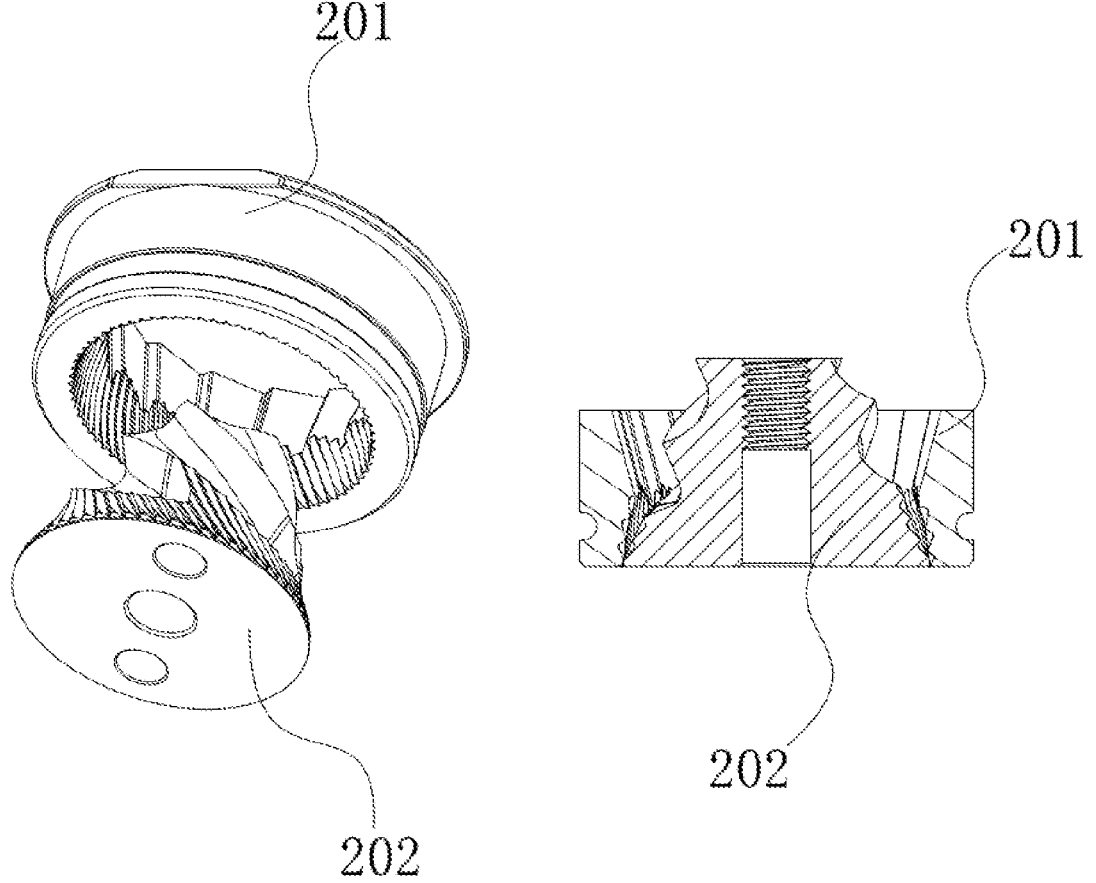
FIG. 4 is a schematic view of an inner grinding wheel and an outer grinding wheel of the present disclosure.
Figure 5:
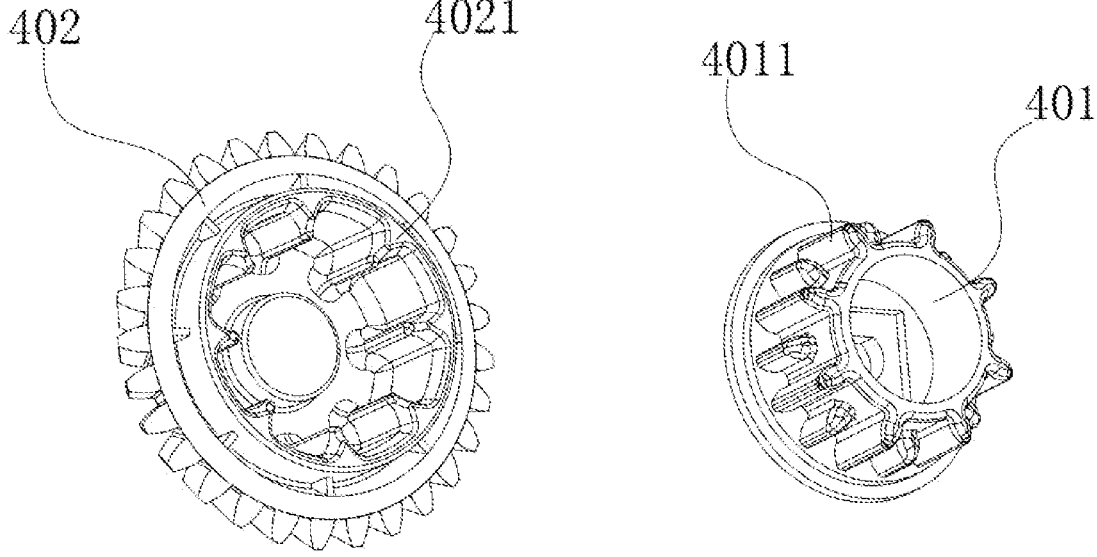
FIG. 5 is schematic view of a first gear and a second gear of the present disclosure.
Figure 6:
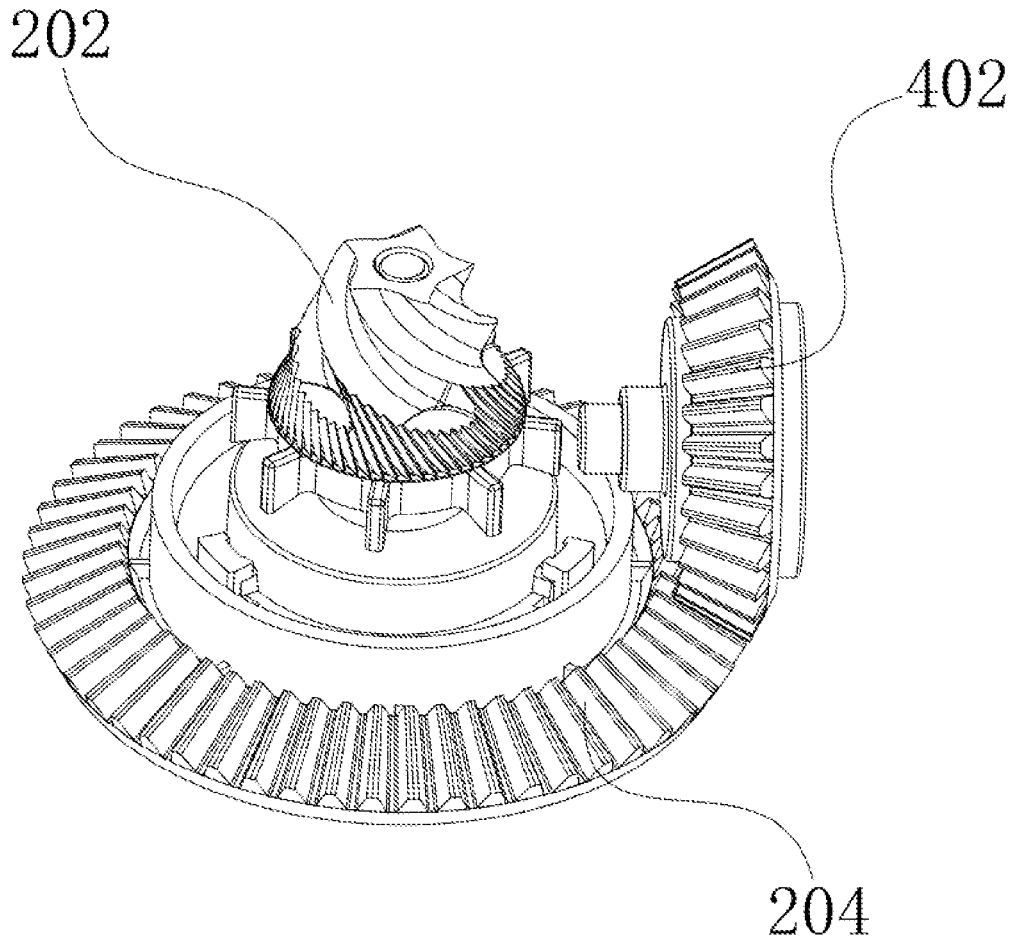
FIG. 6 is a transmission schematic view of bevel gears of the present disclosure.
Figure 7:
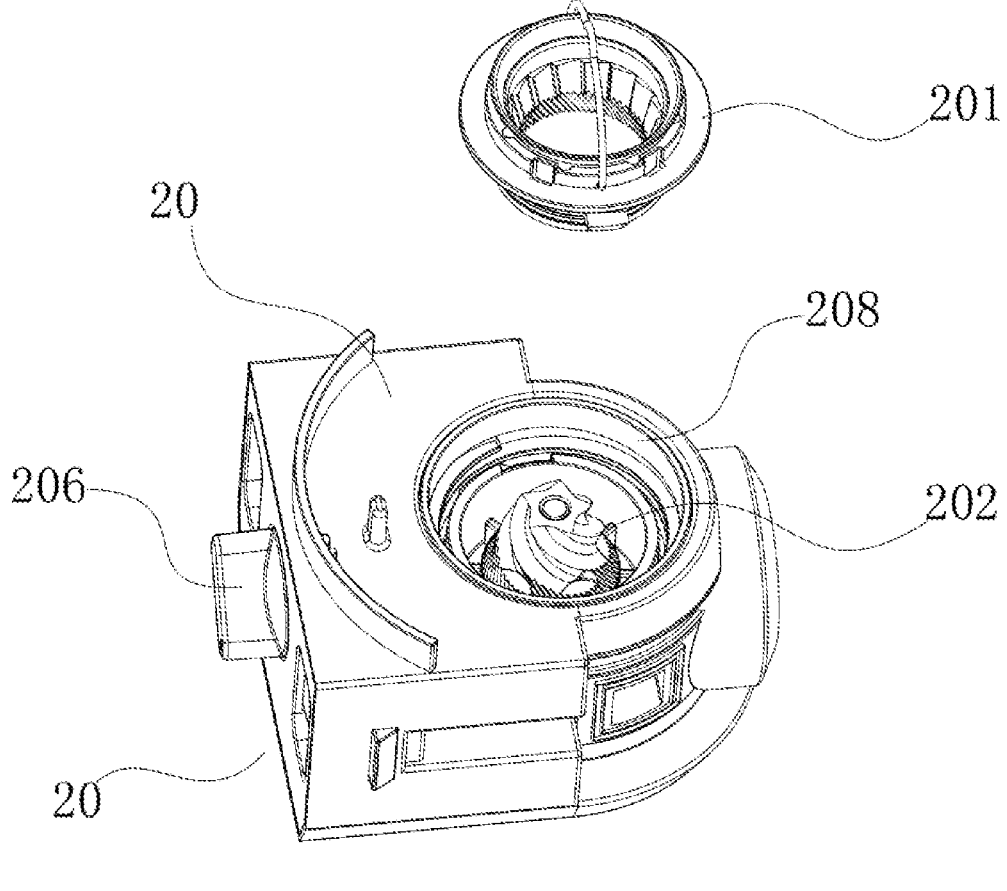
FIG. 7 is a schematic view of a grinding device of the present disclosure.

As shown in FIGS. 1 to 7, a bean grinding coffee machine includes a body 10, a grinding device 20, a driving device 30, a first gear 401, a second gear 402, and a raw material box 50. The grinding device 20 includes an outer grinding wheel 201, an inner grinding wheel 202, a bevel gear 204, a knob 206, an adjustment gear 207, and an adjustment ring 208. The driving device 30 includes a driving motor 301, a reduction gear assembly 302, a reduction box housing 303. The driving device 30 is located on the body 10. The grinding device is detachably connected to the body 10. The grinding device 20 is provided with a transmission shaft 203, the drive device 30 is provided with a driving shaft 304, and the transmission shaft 203 is in transmission connection with the driving shaft 304. The driving device 30 is located on a circumferential side of the transmission shaft 203.

The grinding device 20 and the driving device 30 are mounted on body 10. The driving device 30 drives the grinding device 20 to move. Coffee beans are fed between the outer grinding wheel 201 and the inner grinding wheel 202, the outer grinding wheel 201 does not move, and the inner grinding wheel 202 rotates to grind the coffee beans into powder for brewing. When it is necessary to clean or maintain the outer grinding wheel 201 and the inner grinding wheel 202, the outer grinding wheel 201 and the inner grinding wheel 202 are detached from the body 10, and the outer grinding wheel 201 and the inner grinding wheel 202 can be cleaned separately to facilitate cleaning and maintenance. The driving device 30 is located on the circumferential side of the transmission shaft 203, and the driving shaft 304 provides power for the transmission shaft 203 in a lateral direction of the transmission shaft 203. This mounting method avoids a requirement for a longer space volume to achieve a transmission due to the coaxial mounting of the driving shaft 304 and the transmission shaft 203. The mounting method of the device can reduce an axial volume of the machine, so that the whole machine is smaller and lighter, and is easier to be used.

The driving device 30 is integrated with the body 10. The grinding device 20 is detachably connected to the driving device 30. The first gear 401 is fixed on the driving shaft 304, the second gear 402 is mounted on the grinding device, and an inner side of the second gear 402 is engaged with an outer edge of the first gear 401. The inner side of the second gear 402 is provided with a plurality of annularly arranged inner convex teeth 4021, and a circumferential outer edge of the first gear 401 is provided with a plurality of annularly arranged outer convex teeth 4011. The second gear 402 is engaged with the first gear 401 and the inner convex teeth 4021, and the outer convex teeth 4011 are engaged alternately with each other.

As shown in FIG. 2 to FIG. 6, the grinding device 20 and the driving device 30 are fixed by first gear 401 and second gear 402, and power is transferred by first gear 401 and second gear 402. When the grinding device 20 is required to work, the second gear 402 located on the grinding device 20 is aligned with and inserted to the first gear 401, the inner convex teeth 4021 and the outer convex teeth 4011 are tightly engaged with each other, and power output from the driving motor 301 drives the second gear 402 to rotate, thereby transferring the power to the grinding device 20. When the grinding device 20 needs to be cleaned, the second gear 402 is pulled out directly along an axial direction of the second gear 402, so that the first gear 401 and the second gear 402 are disengaged from each other, the transmission is invalid. The grinding device 20 is removed, the grinding device 20 is disengaged from the body 10, and the outer grinding wheel 201 and the inner grinding wheel 202 may be cleaned one by one. The device using gear transmission has the advantages of large torque, constant transmission ratio, high transmission efficiency, reliable work, long service life and compact structure, and is suitable for long-term operation and repeated start-up and stop in the bean grinding coffee machine.

One end of the transmission shaft 203 is fixed to the inner grinding wheel 202, and the other end of the transmission shaft 203 is fixed to the bevel gear 204. The outer grinding wheel 201 is sleeved on the inner grinding wheel 202, and the inner grinding wheel 202 is coaxially fixed to the transmission shaft 203. An outer edge of the second gear 402 is provided with bevel teeth, the bevel gear 204 is engaged with the second gear 402 through the bevel teeth. The driving shaft 304 is in transmission connection with the transmission shaft 203 through the first gear 401, the second gear 402, and the bevel gear 204.

The power of the driving motor 301 is output to the first gear 401, and the first gear 401 transfers the power to the bevel gear 204 through the bevel teeth located on the second gear 402, so as to rotate the bevel gear 204. The bevel gear 204, the shaft 203, and the inner grinding wheel 202 are coaxially fixed, so that the inner grinding wheel 202 rotates to grind the coffee beans, thus achieving that the driving shaft 304 is located at a lateral direction of the transmission shaft 203 and transfers the power to the transmission shaft 203. This avoids that the driving shaft 304 and the transmission shaft 203 are located on the same axis, and requires a longer axial space of the device for mounting, which reduces the mounting volume.

The knob 206 is coaxially fixed to the adjustment gear 207. The adjustment gear 207 and the adjustment ring 208 are both provided with bevel teeth, and the adjustment ring 208 is located on an outer side of the outer grinding wheel 201 and the adjustment ring 208 is engaged with the adjustment gear 207. The outer side of the outer grinding wheel 201 is provided with a fixing buckle, and an inner side of the adjustment ring 208 is provided with a thread, and the thread and the fixing buckle are engaged with each other.

The knob 206 is adjusted to drive the adjustment gear 207 to rotate. The adjustment gear 207 is adjusted to engage the adjustment ring 208, then the adjustment ring 208 will also rotate thereupon. When the adjustment ring 208 rotates, the thread in the adjustment ring 208 rotate relative to the fixing buckle, so that the outer grinding wheel 201 will also rotate thereupon. When the outer grinding wheel 201 rotates along the thread, a position of the outer grinding wheel 201 in a vertical direction will change. Under the premise that the position of the inner grinding wheel 202 in the vertical direction remains unchanged, a gap between the inner grinding wheel 202 and outer grinding wheels 201 is changed by changing the position of the outer grinding wheel 201 in the vertical direction. When the coffee beans enter the gap between the inner grinding wheel 202 and outer grinding wheel 201, different sizes of particles can be ground, which can meet consumers' requirements for different fineness and uniformity of coffee powder.

The raw material box 50 is provided with a screwing portion and a discharging port. The raw material box 50 is arranged on the body 10 through the screwing portion, and the discharging port is aligned with the grinding device 20. The raw material box 50 is used to store the coffee beans. When the machine stops working, the bean box is removed first, and the consumer can detach the grinding device 20 from the body 10 for individual deep cleaning. When the machine works, the grinding device 20 is mounted first, and then the raw material box 50 is mounted above the grinding device 20, and the raw material box 50 is fixed to the body 10 by rotation.

The driving motor 301 is in transmission connection with the reduction gear assembly 302. The driving shaft 304 is located at an output end of the reduction gear assembly 302, and the reduction box housing 303 covers the reduction gear assembly 302. The driving motor 301 has relatively high output power, speed, and torque, and the power, speed, and torque are reduced through the reduction gear assembly 302 to achieve the power, speed, and torque required by the grinding device 20 to avoid damage to components due to overload.

Two sides of the body 10 are provided with movable buckles 101, and the grinding device 20 is connected to the body 10 through the movable buckles 101. The grinding device 20 is fixed to the machine body 10 by opening the movable buckle 101. When the grinding device 20 is required to be removed, the grinding device 20 can be removed after opening the movable buckle 101.

A method for controlling a bean grinding coffee machine includes the following steps.

The driving device 30 provided on the body 10 is activated and located on the circumferential side of the transmission shaft 203, the driving device 30 transfers power to the grinding device 20 through a driving portion and the transmission shaft 203.

Transmission shaft 203 obtains the power and drives the inner grinding wheel 202 to rotate, the outer grinding wheel 201 is fixed, and inner grinding wheel 202 and outer grinding wheel 201 rotate relatively.

The raw material is fed into in the gap between the inner grinding wheel 202 and outer grinding wheel 201, and the grinding device 20 grinds the raw material into ground substance.

The driving device 30 is turn off to stop working of the grinding device 20.

The purpose of the above embodiment is to carry out exemplary reproduction and derivation to the technical solution of the present disclosure, and completely describe the technical solution, purpose and effect of the present disclosure with this, and its purpose is to make the public understand more thoroughly and comprehensively the disclosure content of the present disclosure, and does not limit the protection scope of the present disclosure thereby.

The above embodiments are not exhaustive enumerations based on the present disclosure, and besides this, there may also be many other embodiments that are not listed. Any replacements and improvements made within the spirit and principles of the present disclosure shall be included within the protection scope of this technical solution.

What is claimed is:

1. A bean grinding coffee machine, comprising: a body, a grinding device, and a driving device, wherein the driving device and the grinding device are located on the body, the grinding device is provided with a transmission shaft and a conical grinding wheel assembly, the conical grinding wheel assembly comprises an outer grinding wheel and an inner grinding wheel, the outer grinding wheel is sleeved on the inner grinding wheel; the grinding device is detachably connected to the driving device, the driving device is provided with a driving portion, the transmission shaft is in transmission connection with the driving portion, and the driving device is located on a circumferential side of the transmission shaft; and wherein the driving portion comprises a driving shaft, a first gear, and a second gear, the first gear is fixed on the driving shaft, the second gear is mounted on the grinding device, and an inner side of the second gear is engaged with an outer edge of the first gear;

wherein the inner side of the second gear is provided with a plurality of annularly arranged inner convex teeth, a circumferential outer edge of the first gear is provided with a plurality of annularly arranged outer convex teeth, the second gear is engaged with the first gear, and the inner convex teeth are alternatively engaged with the outer convex teeth;

wherein the grinding device further comprises a bevel gear, one end of the transmission shaft is fixed to the inner grinding wheel, another end of the transmission shaft is fixed to the bevel gear, the inner grinding wheel is coaxially fixed to the transmission shaft, an outer edge of the second gear is provided with bevel teeth, the bevel gear is engaged with the second gear through the bevel teeth, and the driving shaft is in transmission connection with the transmission shaft through the first gear, the second gear, and the bevel gear.

2. The bean grinding coffee machine according to claim 1, wherein the grinding device further comprises a knob, an adjustment gear, and an adjustment ring, the knob is coaxially fixed to the adjustment gear, the adjustment gear and the adjustment ring are both provided with bevel teeth, the adjustment ring is located on an outer side of the outer grinding wheel, and the adjustment ring is engaged with the adjustment gear.

3. The bean grinding coffee machine according to claim 2, wherein the outer side of the outer grinding wheel is provided with a fixing buckle, an inner side of the adjustment ring is provided with a thread, and the thread and the fixing buckle are engaged with each other.

4. The bean grinding coffee machine according to claim 1, further comprising:

a raw material box providing with a screwing portion and a discharging port, wherein the raw material box is arranged on the body through the screwing portion, and the discharging port is aligned with the grinding device.

5. The bean grinding coffee machine according to claim 1, wherein the driving device comprises a driving motor, a reduction gear assembly, and a reduction box housing, the driving motor is in transmission connection with the reduction gear assembly, the driving shaft is located at an output end of the reduction gear assembly, and the reduction box housing covers the reduction gear assembly.

6. The bean grinding coffee machine according to claim 1, wherein two sides of the body are provided with movable buckles, and the grinding device is connected to the body through the movable buckles.

7. A method for controlling a bean grinding coffee machine, comprising:

activating a driving device provided on a body and located on a circumferential side of a transmission shaft, and transferring, by the driving device, power to a grinding device through a driving portion and the transmission shaft, wherein the driving portion comprises a driving shaft, a first gear, and a second gear, the first gear is fixed on the driving shaft, the second gear is mounted on the grinding device, and an inner side of the second gear is engaged with an outer edge of the first gear, wherein the inner side of the second gear is provided with a plurality of annularly arranged inner convex teeth, a circumferential outer edge of the first gear is provided with a plurality of annularly arranged outer convex teeth, the second gear is engaged with the first gear, and the inner convex teeth are alternatively engaged with the outer convex teeth; the grinding device further comprises a bevel gear, one end of the transmission shaft is fixed to the inner grinding wheel, another end of the transmission shaft is fixed to the bevel gear, the inner grinding wheel is coaxially fixed to the transmission shaft, an outer edge of the second gear is provided with bevel teeth, the bevel gear is engaged with the second gear through the bevel teeth, and the driving shaft is in transmission connection with the transmission shaft through the first gear, the second gear, and the bevel gear;

obtaining the power by the transmission shaft, driving an inner grinding wheel to rotate, fixing an outer grinding wheel, and performing relative rotation between the inner grinding wheel and outer grinding wheel;

feeding raw material into in a gap between the inner grinding wheel and outer grinding wheel, and grinding, by the grinding device, the raw material into ground substance; and turning off the driving device to stop working of the grinding device.

* * * * *